(12) United States Patent
Tsuji et al.

(10) Patent No.: US 12,440,605 B2
(45) Date of Patent: Oct. 14, 2025

(54) METHOD FOR PRODUCING REGENERATED HAIR FOLLICLE PRIMORDIUM

(71) Applicants: ORGAN TECHNOLOGIES, INC., Tokyo (JP); RIKEN, Wako (JP)

(72) Inventors: Takashi Tsuji, Wako (JP); Yutaka Mori, Kyoto (JP); Koh-ei Toyoshima, Tokyo (JP)

(73) Assignees: ORGAN TECHNOLOGIES, INC., Tokyo (JP); RIKEN, Wako (JP)

( * ) Notice: Subject to any disclaimer, the term of this patent is extended or adjusted under 35 U.S.C. 154(b) by 992 days.

(21) Appl. No.: 16/972,103

(22) PCT Filed: May 31, 2019

(86) PCT No.: PCT/JP2019/021690
§ 371 (c)(1),
(2) Date: Dec. 4, 2020

(87) PCT Pub. No.: WO2019/235375
PCT Pub. Date: Dec. 12, 2019

(65) Prior Publication Data
US 2021/0196861 A1 Jul. 1, 2021

(30) Foreign Application Priority Data
Jun. 4, 2018 (JP) .................. 2018-106626

(51) Int. Cl.
A61K 36/00 (2006.01)
A61L 27/38 (2006.01)
C12N 5/071 (2010.01)
C12N 5/0775 (2010.01)

(52) U.S. Cl.
CPC ....... *A61L 27/3895* (2013.01); *A61L 27/3886* (2013.01); *C12N 5/0627* (2013.01); *C12N 5/0666* (2013.01); *A61L 2430/18* (2013.01)

(58) Field of Classification Search
None
See application file for complete search history.

(56) References Cited

U.S. PATENT DOCUMENTS

| 2010/0021866 A1 | 1/2010 | Tsuji et al. |
| 2014/0037592 A1 | 2/2014 | Toyoshima et al. |
| 2014/0052167 A1 | 2/2014 | Toyoshima et al. |
| 2019/0062687 A1 | 2/2019 | Fukuda et al. |

FOREIGN PATENT DOCUMENTS

| JP | 2003-70466 A | 3/2003 |
| WO | 2006/129672 A1 | 12/2006 |
| WO | 2012/108069 A1 | 8/2012 |
| WO | 2012/115079 A1 | 8/2012 |
| WO | 2017/073625 A1 | 5/2017 |

OTHER PUBLICATIONS

International Search Report dated Aug. 20, 2019, issued in counterpart application No. PCT/JP2019/021690, w/ English translation (7 pages).
Written Opinion dated Aug. 20, 2019, issued in counterpart application No. PCT/JP2019/021690 (6 pages).

*Primary Examiner* — Russell G Fiebig
(74) *Attorney, Agent, or Firm* — WHDA, LLP (57) ABSTRACT

The present invention provides a method for producing regenerated hair follicle primordium that allows production of regenerated hair follicle primordium more easily and in larger amounts compared to conventional production methods.
A method for producing regenerated hair follicle primordium comprising a step of obtaining hair follicle primordium by culturing a first population of cells comprising epithelial cells and a second population of cells comprising mesenchymal cells while allowing them to be in contact is provided. The production method of the present invention is characterized in that at least either one of said first population of cells and said second population of cells has formed cell aggregates before said contact, and a culture support is not used when contacting the other population of cells with said cell aggregate.

16 Claims, 5 Drawing Sheets

METHOD FOR PRODUCING REGENERATED HAIR FOLLICLE PRIMORDIUM

TECHNICAL FIELD

The present invention relates to a method for producing regenerated hair follicle primordium that allows production of regenerated hair follicle primordium more easily and in larger amounts compared to conventional production methods.

BACKGROUND ART

In teeth or salivary glands which are epithelial appendages as well as hair follicles which are skin appendages, research aiming for regeneration of its organ primordium is being advanced. Although these organs are not directly related to maintenance of life, since loss or dysfunction thereof has a great influence on QOL, restoration of function by organ regeneration is greatly anticipated.

In regards to hair follicle regeneration, there have been attempts of regenerating hair follicle variable region by substituting mesenchymal cells (hair papilla cells and dermal root sheath cells), new growth of hair follicles by mesenchymal cells having hair follicle inducibility, reconstruction of hair follicles by epithelial/mesenchymal cells, and the like. Up to now, the present inventors have reported each of a method for regenerating hair follicle primordium from adult mouse whisker-derived bulge region epithelial cells and adult mouse whisker-derived cultured hair papilla cells (Patent Literature 1), a method for producing regenerated hair follicle primordium equipped with a guide that assists in contacting recipient tissue and hair pore formation (Patent Literature 2), and a method for producing regenerated hair follicle primordium for transplantation having controlled hair color of hair growth (Patent Literature 3).

CITATION LIST

[Patent Literature 1] International Publication No. 2006/129672
[Patent Literature 2] International Publication No. 2012/108069
[Patent Literature 3] International Publication No. 2012/115079

SUMMARY OF THE INVENTION

Problems to be Solved by the Invention

A technology for producing regenerated hair follicle primordium in a large quantity is necessary towards the realization of hair regenerative medicine.

In the methods described in Patent Literatures 1 and 2, because it was thought that epithelial cells and mesenchymal cells need to stay in contact while maintaining a high density state in the process of culturing epithelial cell-derived cell aggregates and mesenchymal lineage cell-derived cell aggregates to produce hair follicle primordium, a culture support that allows epithelial cell-derived cell aggregates and mesenchymal lineage cell-derived cell aggregates to be cultured therein have been used for producing regenerated hair follicle primordium. In other words, in the conventional method, since epithelial cell-derived cell aggregates and mesenchymal lineage cell-derived cell aggregates were each prepared, and an operation was performed to insert these cell aggregates into a culture support with a micropipette etc., detailed manipulation was required for producing each individual regenerated hair follicle primordium, and it could not be said to be necessarily suitable for production of a large quantity of regenerated hair follicle primordium.

Moreover, with traditional methods, for epithelial cells and mesenchymal cells used for producing regenerated hair follicle primordium, a high density state cell mass was obtained by centrifuging after cell culture, a cell mass of an appropriate number of cells per hair follicle primordium was picked up with a micropipette etc. from said cell mass, and then inserted into a culture support. Accordingly, the cells inside said high density state cell mass were placed under a high density state for an extended period of time, and reduction and variability in cell quality was of concern.

Further, until now, collagen gel derived from heterologous organisms etc. has been employed as culture support material. However, a method that does not use raw materials derived from heterologous organisms as much as possible is sought after for human clinical application.

The present invention handles one or more of the above problems.

Means for Solving the Problems

The present invention relates to a method for easily producing individual regenerated hair follicle primordium without preparing a high density state cell mass, by forming an appropriate cell aggregate on at least either one of a population of cells comprising epithelial cells or a population of cells comprising mesenchymal cells.

The present invention also relates to a method for producing regenerated hair follicle primordium that does not use a culture support.

Specifically, the production method of the present invention encompasses the following embodiments:

[1] A method for producing regenerated hair follicle primordium, characterized in that it comprises a step of obtaining regenerated hair follicle primordium by culturing a first population of cells comprising epithelial cells and a second population of cells comprising mesenchymal cells while allowing them to be in contact,
wherein
at least either one of said first population of cells and said second population of cells has formed cell aggregates before said contact, and
a culture support is not used when contacting the other population of cells with said cell aggregate.

[2] The production method according to [1], further comprising prior to said contact a step of forming a first cell aggregate of said epithelial cells aggregated as said first population of cells.

[3] The production method according to [2], wherein the step of forming said first cell aggregate comprises obtaining a spheroid of epithelial cells.

[4] The production method according to any of [1]-[3], further comprising prior to said contact a step of forming a second cell aggregate of said mesenchymal cells aggregated, as said second population of cells.

[5] The production method according to [4], wherein the step of forming said second cell aggregate comprises obtaining a spheroid of mesenchymal cells.

[6] The production method according to any of [2]-[5], wherein at least one of the step of forming said first cell aggregate and the step of forming said second cell aggregate comprises aggregating said epithelial cells or said mesenchymal cells in a recess configured so that said epithelial cells or said mesenchymal cells are accumulated at the bottom.

[7] The production method according to [6], wherein said recess has a V-shaped or a U-shaped bottom.

[8] The production method according to any of [2]-[7], wherein the formation of said aggregate is performed by a centrifugation process performed at a centrifugal force (RCF) of 600×g or lower.

[9] The production method according to any of [6]-[8], wherein said contact is performed by placing said first cell aggregate on said second cell aggregate which is placed in said recess.

[10] The production method according to any of [6]-[8], wherein said contact is performed by supplying a cell suspension comprising said first population of cells to said second cell aggregate placed in said recess.

[11] The production method according to any of [1]-[10], wherein said first population of cells comprising epithelial cells is a cell population of bulge region epithelium-derived cultured cells subjected to single-celling treatment.

[12] The production method according to any of [1]-[11], wherein said second population of cells comprising mesenchymal cells is a cell population of hair papilla-derived cultured cells subjected to single-celling treatment.

[13] The production method according to any of [1]-[12], wherein at least one of said epithelial cells and said mesenchymal cells is derived from adult hair follicles.

[14] The production method according to any of [1]-[13], further comprising a step of placing a guide in the cell aggregate of said first population of cells or the cell aggregate of said second population of cells before said contact.

[15] The production method according to [14], wherein said guide is a filamentous structure.

[16] The production method according to [14] or [15], wherein said step of placing a guide comprises placing said guide before the start of or during the formation of said first cell aggregate or said second cell aggregate at the position where the cell aggregate of said first population of cells or the cell aggregate of said second population of cells will be formed.

[17] The production method according to any of [14]-[16], wherein said step of placing a guide comprises inserting a guide into either of the cell aggregate of said first population of cells or the cell aggregate of said second population of cells.

[18] The production method according to any of [14]-[17], further comprising contacting the cell aggregate having said guide placed therein and the other population of cells so that said guide penetrates and protrudes on the exterior of at least said first population of cells or the cell aggregate thereof.

[19] The production method according to any of [1]-[13], further comprising a step of inserting a guide so that it penetrates and protrudes on the exterior of at least said first population of cells after said contact.

[20] The production method according to [19], wherein said guide is a filamentous structure.

[21] The production method according to any of [14]-[20], wherein said guide is a fiber made from a synthetic polymer or a bioabsorbable polymer, a metallic fiber, a carbon fiber, a glass fiber, an animal fiber, or a plant fiber.

[22] A method for producing regenerated hair follicle primordium, characterized in that it comprises:
  a step of forming a first cell aggregate having aggregated epithelial cells,
  a step of forming a second cell aggregate having aggregated mesenchymal cells, and
  a step of obtaining hair follicle primordium by culturing said first cell aggregate and said second cell aggregate while allowing them to be in contact,
wherein a culture support is not used when one cell aggregate is contacted with the other cell aggregate.

[23] Regenerated hair follicle primordium produced by the production method according to any of [1]-[22].

[24] A method for transplanting regenerated hair follicle primordium, comprising a step of transplanting said hair follicle primordium produced by the production method according to any of [1]-[22] to a subject site.

[25] A transplantation method comprising a step of transplanting said hair follicle primordium produced by the production method according to any of [14]-[21] to a subject site, wherein the step of transplanting said hair follicle primordium to said subject site comprises performing the step so that the epithelial cell side portion of said hair follicle primordium and the epithelial cell side of the recipient tissue are in contact with a given orientation by way of said guide.

An invention of any combination of one or more characteristics of the present invention listed above is also encompassed by the scope of the present invention.

Effects of the Invention

According to the embodiments of the present invention, a novel method for producing regenerated hair follicle primordium that allows easy production of a large quantity of hair follicle primordium is provided.

DESCRIPTION OF EMBODIMENTS

The embodiments of the present invention will now be described in detail below.

The present invention relates to a method for producing regenerated hair follicle primordium (hereinafter also referred to as the production method of the present invention).

Hair follicle primordium is the tissue to be the origin of hair follicles, and is composed of epithelial cells and mesenchymal cells. Hair follicle primordium is formed by thickening of a part of the epidermis in the embryonic stage and aggregation of the facing mesenchymal cells.

"Regenerated hair follicle primordium" herein refers to e.g. hair follicle primordium artificially induced or regenerated from epithelial cells and mesenchymal cells by the production method of the present invention.

The production method of the present invention comprises a step of obtaining hair follicle primordium by culturing a first population of cells comprising epithelial cells and a second population of cells comprising mesenchymal cells while allowing them to be in contact.

"Epithelial cells" herein mean epithelial tissue-derived cells as well as cells that are obtained by culturing those cells, and "mesenchymal cells" mean mesenchymal tissue-derived cells as well as cells that are obtained by culturing those cells. Typically, epithelial cells and mesenchymal cells can be prepared from hair follicles. For example, as epithelial cells, outer root sheath outermost layer cells of the bulge region, epithelial cells at the hair matrix base, or hair follicle epithelial cells induced from iPS cells or ES cells, and the like can be employed, and as mesenchymal cells, hair papilla cells, dermal root sheath cells, nascent skin mesenchymal cells, or hair follicle mesenchymal cells induced from iPS cells or ES cells, and the like can be employed.

Epithelial cells or mesenchymal cells, or a tissue comprising these cells that can be used in the production of regenerated hair follicle primordium can be collected from e.g. various animals such as mammalian primates (such as humans and monkeys), ungulates (such as pigs, cows, and horses), small mammalian rodents (such as mice, rats, and rabbits), as well as dogs and cats. For the collection of epithelial cells or mesenchymal cells, or a tissue comprising these cells, conditions employed for tissue collection may be generally applied without change, and may be removed in a sterile state and stored in an appropriate preservation solution.

The preparation of epithelial cells or mesenchymal cells from hair follicles was carried out by for example first separating hair follicles isolated from surrounding tissue into epithelial tissue and mesenchymal tissue according to the tissue shape. In doing so, enzymes may be employed to facilitate separation. Enzymes can include those well-known such as dispase, collagenase, trypsin, and the like, and those skilled in the art can appropriately use a preferred enzyme.

Moreover, epithelial cells or mesenchymal cells derived from those other than hair follicles may also be used for the production of regenerated hair follicle primordium. Epithelial cells derived from those other than hair follicles include, but are not limited to, epithelial cells of skin or oral mucosa or gingiva, preferably, premature epithelial progenitor cells that may differentiate into differentiated, e.g. keratinized or parakeratotic epithelial cells such as skin or mucosa, for example non-keratinized epithelial cells or stem cells thereof, and the like. Specifically, an example of employing oral epithelial cells or primary cultured cells thereof as epithelial cells is described in Japanese Published Unexamined Patent Application Publication No. 2008-29756, the disclosure of which is incorporated herein by reference in its entirety. Moreover, mesenchymal cells derived from those other than hair follicles include, but are not limited to, bone marrow cells that do not comprise blood cells, preferably, oral mesenchymal cells, mesenchymal cells derived from bone marrow cells inside jaw bones or cephalic neural crest cells, or mesenchymal progenitor cells or stem cells thereof that may differentiate into these mesenchymal cells, and the like. Specifically, an example of employing amnion-derived cells as mesenchymal cells is described in Japanese Published Unexamined Patent Application Publication No. 2008-206500, and an example of employing cells that were differentiated and induced from totipotent stem cells is described in Japanese Published Unexamined Patent Application Publication No. 2008-200033, the disclosures of which are incorporated herein by reference in its entirety. Note that with respect to utilizing autologous tissue, it is preferred to employ mesenchymal cells and epithelial cells derived from the transplantation subject, or a tissue comprising these cells.

The origin of the ES cells that can be employed herein is not particularly limited, and ES cells derived from any and all animal inner cell mass can be employed. For example, ES cells derived from inner cell masses of human, mouse, rat, dog, cat, rabbit, cow, horse, sheep, goat, pig, or monkey can be employed as the origin of the ES cells.

"iPS cells (induced Pluripotent Stem cells)" generally refer to cells that, for example by introducing several types of genes and/or agents into somatic cells, are rendered differentiation versatility that allows differentiation into numerous cells and are rendered self-replication ability that allows maintenance of differentiation versatility even after undergoing division and proliferation, as with ES cells. However, in the present invention, the term is not limited to the above description, and cells recognized by those skilled in the art as "iPS cells" are broadly encompassed.

The origin of the iPS cells that can be employed herein is not particularly limited, and iPS cells derived from any and all animals can be employed. For example, iPS cells derived from human, mouse, rat, dog, cat, rabbit, cow, horse, sheep, goat, pig, or monkey can be employed as the origin of the iPS cells. Moreover, the somatic cells to be the origin of the iPS cells that can be employed herein are not particularly limited, and iPS cells induced from cells derived from any and all tissue can be employed. Further, the method for inducing iPS cells that can be employed herein is not particularly limited, and iPS cells induced with any method can also be employed, as long as it is a method that allows the induction of iPS cells from somatic cells.

In one embodiment of the present invention, a "first population of cells comprising epithelial cells" is a population of cells composed substantially of epithelial cells. "Composed substantially of epithelial cells" herein, in terms of production of hair follicle primordium, may mean either serving a function that is the same as when composed only of epithelial cells, or comprising cells other than those that are to become epithelial cells as little as possible. Alternatively, a population of cells composed substantially of epithelial cells may mean a population where the epithelial cells are 80% or higher, or 90% or higher, or 95% or higher, or more, in cells constituting said population of cells.

In one embodiment of the present invention, a "second population of cells comprising mesenchymal cells" is a population of cells composed substantially of mesenchymal cells. "Composed substantially of mesenchymal cells" herein, in terms of production of hair follicle primordium, may mean either serving a function that is the same as when composed only of epithelial cells, or comprising cells other than those that are to become mesenchymal cells as little as possible. Alternatively, a population of cells composed substantially of mesenchymal cells may mean a population where mesenchymal cells are 90% or higher, 95% or higher, or more, in cells constituting said population of cells.

It is preferred that at least one of the epithelial cells and mesenchymal cells used in the present invention is derived from hair follicles. Moreover, it is preferred that said hair follicles are those in the growth phase. By using cells derived from hair follicles in the growth phase, it is possible to induce regenerated hair having good quality at great frequency. Moreover, the hair follicles may be derived from fetuses or adults. When collecting cells from fetus-derived hair follicles, it is preferred in that hair follicle cells in the developmental stage of the hair follicle organs can be efficiency collected, and that undifferentiated cells can be obtained. On the other hand, when collecting cells from adult-derived hair follicles, it is preferred in that cell distribution regionality in organs can be utilized to separate and obtain useful cells, and in particular when the present invention is clinically applied to humans, it is preferred in terms of avoiding immune rejection or avoiding ethical problems such as utilization of ES cells, since subjects' cells can be utilized. Further, there are reports that hair follicles after transplantation are immunologically tolerated (Reynolds et. al., Trans-gender induction of hair follicles. Nature. 1999 Nov. 4; 402(6757):33-4.), or alternatively, if immunosuppression is possible by other methods, surgical material derived from an adult from another family produced from e.g. aesthetic plastic surgery etc. can be utilized, and they will be extremely valuable in industrial use and thus preferred.

In another embodiment of the present invention, the "first population of cells comprising epithelial cells" is a population of bulge region epithelium-derived cells. Such population of cells can be prepared by collecting tissue from the bulge region epithelium (such as outer root sheath outermost layer) and subjecting to single-celling treatment.

In yet another embodiment of the present invention, the "first population of cells comprising epithelial cells" is a cell population of bulge region epithelium-derived cultured cells subjected to single-celling treatment. Such population of cells can be prepared by collecting tissue from the bulge region epithelium (such as outer root sheath outermost layer), subjecting the tissue to single-celling treatment, subjecting to primary culture and any passage cultures, and then subjecting the cultured cells again to single-celling treatment.

In another embodiment of the present invention, the "second population of cells comprising mesenchymal cells" is a population of hair papilla cell-derived cells. Such population of cells can be prepared by collecting hair papilla from hair follicles and subjecting to single-celling treatment.

In yet another embodiment of the present invention, the "second population of cells comprising mesenchymal cells" is a cell population of hair papilla-derived cultured cells subjected to single-celling treatment. Such population of cells can be prepared by collecting hair papilla from hair follicles, subjecting the tissue to single-celling treatment, subjecting to primary culture and any passage cultures, and then subjecting the cultured cells again to single-celling treatment.

"Single-celling" herein refers to a treatment of separating multiple cells in a state of being bound or adhered to each other (typically a tissue or an organ) into individual cells. A method well-known to those skilled in the art may be employed as such single-celling treatment, and without being limited thereto, can be performed by e.g. enzyme treatment. Enzymes that can be used in the aforementioned enzyme treatment and their conditions of use are also well-known to those skilled in the art, and for example, enzymes such as dispase, collagenase, and trypsin can be used. Single-celling is preferred in that it can promote the homogenization of cells in the population of epithelial cells and population of mesenchymal cells prepared, as well as attempt the homogenization of the population of cells employed in the production of hair follicle primordium to thereby maintain the quality.

In order to obtain sufficient number of cells, when performing primary culture and passage culture of cells subjected to single-celling treatment, the medium employed for culture can be media generally employed for animal cell culture, such as Dulbecco modified Eagle medium (DMEM). Serum for promoting cell proliferation is added, or as an alternative to serum, e.g. cell growth factors such as FGF, EGF, and PDGF, or a known serum component such as transferrin may be added. The concentration of when adding a serum can be appropriately changed depending on the culture state at the time, and can be ordinarily approximately 10%. For culturing of cells, culturing in an incubator under ordinary culturing conditions, e.g. a temperature of about 37° C. and 5% $CO_2$ concentration can be applied. Moreover, an antibiotic such as streptomycin may be added as appropriate.

In one aspect, the production method of the present invention is characterized in that before contacting the first population of cells and the second population of cells with each other, at least either one thereof has formed cell aggregates.

Accordingly, the production method of the present invention can further comprise the following steps prior to contacting the first population of cells and the second population of cells:
  a step of forming a first cell aggregate having aggregated epithelial cells as said first population of cells, or
  a step of forming a second cell aggregate having aggregated mesenchymal cells as said second population of cells.

Moreover, in another aspect, the production method of the present invention is characterized in that before contacting the first population of cells and the second population of cells with each other, both of them has formed cell aggregates.

Accordingly, the production method of the present invention can further comprise the following steps prior to contacting the first population of cells and the second population of cells:
  a step of forming a first cell aggregate having aggregated epithelial cells as said first population of cells, and
  a step of forming a second cell aggregate having aggregated mesenchymal cells as said second population of cells.

In the production method of the present invention, the first population of cells and the second population of cells are contacted by for example laminating the cell aggregate of one population of cells onto the other population of cells or the cell aggregate thereof. Specifically, the contact of the first population of cells and the second population of cells encompasses the following embodiments:
  (1) Applying a cell suspension comprising the second population of cells to the first cell aggregate;
  (2) Applying a cell suspension comprising the first population of cells to the second cell aggregate;
  (3) Contacting (such as laminating) the second cell aggregate onto the first cell aggregate; and
  (4) Contacting (such as laminating) the first cell aggregate onto the second cell aggregate.

In (1) and (2), one population of cells in a form where the cells are dispersed (cell suspension) is contacted with a cell aggregate derived from the other population of cells formed in advance.

In (3) and (4), cell aggregates are formed in both of the first population of cells and the second population of cells in advance, and one cell aggregate is contacted onto the other cell aggregate.

In any of the embodiments (1)-(4), in order to maintain both population of cells at a high density state, to maintain the contact of both population of cells, or for three dimensional culture, culture support is not used. Here, a "culture support" refers to a gel, fiber, or solid culture support carrier which allows culturing of cells therein, composed of materials such as collagen, agarose gel, carboxymethylcellulose, gelatin, agar, hydrogel, Cellmatrix™, Mebiol Gel™, Matrigel™, elastin, fibrin, laminin, extracellular matrix mixture, polyglycolic acid (PGA), polylactic acid (PLA), and lactic acid/glycolic acid copolymer (PLGA). Note that in the present invention, other means may or may not be employed for maintaining the contact between the population of cells.

A "cell aggregate" may broadly mean any state where cells configuring a population of cells are in close contact with each other, but in the present invention, it is preferred that the cell aggregate is a spheroid. Accordingly, said "step of forming a first cell aggregate" may comprising obtaining a spheroid of epithelial cells, and similarly, said "step of forming a second cell aggregate" may comprise obtaining a spheroid of mesenchymal cells.

The term "spheroid" as used herein refers to a cell aggregate formed via cell aggregation and the subsequent culturing. The culture time required for spheroid formation may vary depending on the aggregation state of cells, and can be e.g. in the range of 2 to 8 hours when the cell density of the cell aggregate at the start of culturing is $1\times10^7$ cells/mL-$1\times10^8$ cells/mL.

In the present invention, the formation of said "cell aggregate" is ordinarily performed by preparing a cell suspension of epithelial cells or mesenchymal cells in a given container. The solutions used in the preparation of a cell suspension include, but are not limited to, e.g. culture medium, buffer, and the like.

In one embodiment of the present invention, said "cell aggregate" is formed in a recess configured so that cells are accumulated at the bottom. Accordingly, in one embodiment of the production method of the present invention, said "step of forming a first cell aggregate" or "step of forming a second cell aggregate" comprises aggregating epithelial cells or mesenchymal cells in a recess configured so that epithelial cells or mesenchymal cells are accumulated at the bottom. By employing such recess, accumulation of epithelial cells or mesenchymal cells and the subsequent aggregation or self-aggregation is promoted.

Said recess is not particularly limited, as long as, for example, its bottom has a slope with an angle sufficient for epithelial cells or mesenchymal cells to accumulate when a cell suspension comprising epithelial cells or mesenchymal cells is added and left still. As a specific example, said "recess" has a V-shaped bottom, a U-shaped bottom, or a bottom where the upper part of the U-shape is a slope that widens into a V-shape, which have a slope with an angle sufficient for epithelial cells or mesenchymal cells to accumulate when a cell suspension comprising epithelial cells or mesenchymal cells is added and left still.

In another embodiment of the present invention, the formation of said "cell aggregate" is performed by a centrifugation process. Centrifugation process is preferred in that cell aggregation can be easily promoted without losing cell activity. The centrifugation process may employ a condition that forms cell aggregates having a cell density of $1\times10^7$ cells/mL-$1\times10^8$ cells/mL, and it is preferred that the upper limit of the centrifugal force (RCF) is 600×g or less. When the centrifugal force (RCF) is lower than 50×g, efficient cell aggregate formation cannot be expected, and when the centrifugal force (RCF) is over 600×g, cell disorder is caused. The centrifugation time may be 0.5 minutes-10 minutes depending on the number of cells.

In yet another embodiment of the present invention, said "cell aggregate" is formed by performing a centrifugation process in a recess configured so that cells are accumulated at the bottom. This allows a more efficient formation of cell aggregates suitable for production of hair follicle primordium.

It is preferred that the cell aggregates formed as above are cultured for a given amount of time (such as 2 to 8 hours) to form spheroids before culturing with the other population of cells.

After the formation of cell aggregates, the supernatant is removed as much as possible from the container leaving the cell aggregates, and used for the subsequent culturing. At this time, it is preferred that components other than the cells of interest (such as culture medium, buffer, and the like) are equal to or less than the cell volume, and it is more preferred that it does not comprise components other than the cells of interest.

In the production method of the present invention, for at least either one of the first population of cells and the second population of cells, cell aggregates are formed in a recess configured so that cells are accumulated at the bottom, the supernatant thereof is removed, and the other population of cells or population of cells is contacted with said cell aggregates while said cell aggregates remain placed in said recess to allow culturing.

Accordingly, in one embodiment, the production method of the present invention comprises forming cell aggregates of first population of cells (first cell aggregates) in a recess configured so that cells are accumulated at the bottom, removing the supernatant, and then contacting said second population of cells onto said first cell aggregates placed in said recess, and culturing (the above (1) and (3)). In this embodiment, said second population of cells may be contacted onto said first cell aggregates in the form of a cell suspension comprising them (the above (1)), or cell aggregates of second population of cells (second cell aggregates) may be separately formed, and the second cell aggregates contacted onto said first cell aggregates (the above (3)). When employed in the form of a cell suspension comprising the second population of cells, in order to assist in the cell contact of the second population of cells against said first cell aggregates, it is preferred that said cell suspension is added to the first cell aggregates foiled on said recess, and then a centrifugation process is performed. The centrifugation process used here can be for example those with a centrifugal force (RCF) of 50-600×g. When the centrifugal force (RCF) is lower than 50×g, efficient cell lamination cannot be expected, and when the centrifugal force (RCF) is over 600×g, cell disorder is caused. After the centrifugation process, components other then the cells are removed as much as possible, substituted with the culture medium, and the first population of cells and the second population of cells can be mix cultured. When the second population of cells is employed as the cell aggregates, the supernatant is removed as much as possible from the first cell aggregates placed on said recess, and then the separately formed second cell aggregates may be contacted onto said first cell aggregates and cultured. In this case, the culture medium may be added to the first cell aggregates before contacting with the second cell aggregates, or may be added after contacting with the second cell aggregates.

In another embodiment, the production method of the present invention comprises forming cell aggregates of said second population of cells (second cell aggregates) in a recess configured so that cells are accumulated at the bottom, removing the supernatant, and then contacting said first population of cells onto said second cell aggregates placed in said recess, and culturing (the above (2) and (4)). In this embodiment, said first population of cells may be contacted onto said second cell aggregates in the form of a cell suspension comprising the first population of cells (the above (2)), or cell aggregates of first population of cells (first cell aggregates) may be separately formed, and the first cell aggregates contacted onto said second cell aggregates (the above (4)). When employed in the form of a cell suspension comprising the first population of cells, in order to assist in the cell contact of the first population of cells against said second cell aggregates, it is preferred that said cell suspension is added to the second cell aggregates on the recess, and then a centrifugation process is performed. The centrifugation process used here can be for example a centrifugation process by a centrifugal force (RCF) of 50-600×g (such as 500×g). After the centrifugation process, components other then the cells are removed as much as possible, substituted with the culture medium, and the second population of cells and the first population of cells are mix cultured. When the first population of cells is employed as the cell aggregates, the separately formed first cell aggregates may be contacted onto the second cell aggregates placed on the recess having the supernatant removed as much as possible and cultured. In this case, the culture medium may be added to the second cell aggregates before contacting with the first cell aggregates, or may be added after contacting with the first cell aggregates.

In the embodiment of contacting the first cell aggregate and said second cell aggregate, means for maintaining the contact with each other is not necessarily required, although said recess or the container equipped with said recess may have a shape or means to maintain one cell aggregate on the other cell aggregate.

The culture period for culturing a first population of cells and second population of cells while allowing them to be in contact will differ depending on the number of cells, the state of cell aggregates, the type of animal, and the like, and those skilled in the art can appropriately select the appropriate condition. By extending the culture period, the formation of hair follicle primordium can be further proceeded. In order to obtain the desired state, for example, culturing lasts at least 3 hours, preferably at least 12 hours, more preferably at least 16 hours, or most preferably at least 24 hours, and the medium or the culturing condition can also be altered during culture.

For example, when regenerated hair follicle primordium is transplanted, it is preferred that the regenerated hair follicle primordium is cultured for at least 1 day in order to obtain functional hair.

Moreover, the culturing condition for when culturing a first population of cells and a second population of cells while allowing them to be in contact can be the condition employed for general animal cell culture. Moreover, a mammal-derived serum may be added to the culture, and various cellular factors known to be effective for proliferation or differentiation of these cells may also be added. Such cellular factors can include FGF, BMP, and the like.

In one aspect, the production method of the present invention can further comprise a step of placing a guide for transplantation at any time during its production steps.

A "guide" that can be used herein is placed in the regenerated hair follicle primordium in order to assist in the contact or connection between the epithelial cell side portion of the regenerated hair follicle primordium and the epithelial cells on the recipient side as well as the subsequent hair pore formation after transplantation of the regenerated hair follicle primordium. The guide employed is not particularly limited as long as it has the above function, and examples include, but are not limited to, filamentous structures or acicular structures and the like. Examples of the material for said guide can include fibers made from synthetic or natural bioabsorbable polymer, metallic fibers such as stainless steel, carbon fibers, glass fibers, and natural animal fibers or plant fibers, and the like, more specifically, nylon filament or stainless steel wire, and the like. In particular, biologically derived hair can also be used as a guide for regenerated hair follicle primordium. Moreover, the guide used in the present invention can also be in the form of a hollow filament. The diameter of the guide can be appropriately set by those skilled in the art, and is for example preferably 5-100 atm, more preferably 20-50 atm. Moreover, the length of the guide used for regenerated hair follicle primordium can also be appropriately set by those skilled in the art, and is for example preferably 1-10 mm, more preferably 4-6 mm.

In the present invention, the guide penetrates at least the epithelial cell side of the regenerated hair follicle primordium produced, and is placed so that it is maintained in a state of protruding on the epithelial cell side. Moreover, in one embodiment of the present invention, the guide penetrates the epithelial cell side and the mesenchymal lineage cell side of the regenerated hair follicle primordium produced, and is placed so that it is maintained in a state of protruding on the epithelial cell side. Accordingly, the production method of the present invention can further comprise a step for placing the guide as described above.

Specifically, in the production method of the present invention, the guide can be placed before contact or after contact of the first population of cells and the second population of cells. When the guide is placed before contact of the first population of cells and the second population of cells, the production method of the present invention can further comprise a step of placing the guide in either one of the cell aggregate of said first population of cells (first cell aggregate) or the cell aggregate of said second population of cells (second cell aggregate). The placement of the guide in the first cell aggregate or the second cell aggregate can be performed before formation, during the formation process, or after formation of said first cell aggregate or said second cell aggregate.

When the guide is placed before or during the formation process of the first cell aggregate or the second cell aggregate, the guide may be placed at the position where the cell aggregate of said first population of cells or the cell aggregate of said second population of cells will be formed. Specifically, by placing the guide in advance at any position inside the container containing the first population of cells or the second population of cells, for example the position in said recess where cells should accumulate, said container can be designed so that the guide is placed with the formation of the first cell aggregate or the second cell aggregate.

When the guide is placed after formation of the first cell aggregate or the second cell aggregate, the guide may be placed by inserting the guide into the first cell aggregate or the second cell aggregate formed.

When placing the guide before contact of the first population of cells and the second population of cells, the contact between the cell aggregate having the guide placed therein and the other population of cells (or the cell aggregate thereof) is performed so that said guide penetrates at least the epithelial cell side of the regenerated hair follicle primordium produced, and is maintained in a state of protruding on the epithelial cell side. Accordingly, in the aforementioned embodiment, the production method of the present invention further comprises contacting the cell aggregate having the guide placed therein and the other population of cells so that said guide penetrates and protrudes on the exterior of at least the epithelial cell side.

In the aforementioned embodiment, in order to ensure that the guide penetrates and protrudes on the exterior of at least the epithelial cell side of the regenerated hair follicle primordium to be produced, it is more preferred that the guide is placed in the first population of cells or the cell aggregate thereof, or alternatively, it is more preferred that the other population of cells to be contacted with the cell aggregate having the guide placed therein has formed cell aggregates.

When the guide is placed after contact of the first population of cells and the second population of cells, in order to ensure that the guide penetrates and protrudes on the exterior of at least the epithelial cell side of the regenerated hair follicle primordium to be produced, the guide may be inserted so that it penetrates and protrudes on the exterior of at least the first population of cells. In the aforementioned embodiment, it is preferred that at least the first population of cells has formed cell aggregates when the first population of cells and the second population of cells are contacted.

When the guide is placed after contact of the cell aggregate of first population of cells and the cell aggregate of second population of cells, the guide may be placed by inserting the guide from the first cell population side, without destroying the contact surface of the first cell population (epithelial cells) side and the second cell population (mesenchymal cells) side among the structure of the regenerated hair follicle primordium produced, so that it penetrates, preferably vertically penetrates, at least the first population of cells. When contacting the cell aggregate of first population of cells and the cell aggregate of second population of cells, it is preferred to set the timing for inserting the guide at immediately after contact in terms of being able to employ a material having low foreign-body reaction against the body as well as being flexible such as nylon filament.

After the guide is placed in the regenerated hair follicle primordium, in particular when the guide is placed at a stage when the formation of regenerated hair follicle primordium has proceeded to some extent, or at a stage when the regenerated hair follicle primordium has been completely produced, it is preferred that further culturing is carried out in a state where the guide is placed therein. The culture period after placing the guide is for example preferably 1-4 days of culture, more preferably 1.5-2 days of culture. By culturing for 2 days after placing the guide, the adherence between the guide and the regenerated hair follicle primordium is strengthened, and thus they will not easily fall apart during transplantation. Moreover, it is preferred because by culturing after placing the guide, the epithelial cell side portion of the regenerated hair follicle primordium can be extended along the guide. Such extension can improve the efficiency and the stability of autonomous adherence between the epithelial cell side portion of the regenerated hair follicle primordium and the epithelial cells of the recipient after transplantation of the regenerated hair follicle primordium.

The regenerated hair follicle primordium produced by the production method of the present invention can be transplanted to the subject site with a method well-known to those skilled in the art, and for example can be transplanted by using hair transplant employing Shapiro type hair transplantation or Choi type hair transplanter, an implanter utilizing air pressure, and the like. Shapiro type hair transplantation is a method of making a transplantation wound at the subject transplantation site with a microscalpel etc., and then transplanting the transplant with tweezers. When applying such hair transplantation, operation is possible without directly touching the regenerated hair follicle primordium if the regenerated hair follicle primordium for transplantation has a guide, and operation can be easily carried out.

The transplantation depth of regenerated hair follicle primordium is for example preferably 0.05-5 mm, more preferably 0.1-1 mm, and most preferably 0.3-0.5 mm. In particular, when transplanting regenerated hair follicle primordium to a recipient, it may be preferred to transplant within the dermal layer, and it may be more preferred that it is above the boundary surface of the dermal/subcutaneous tissue where hair follicle formation and subsequent hair growth efficiency is superior. It is preferred that the regenerated hair follicle primordium at the time of transplantation is transplanted so that the epithelial cell side of the regenerated hair follicle primordium comes on the body surface side of the recipient and the mesenchymal lineage cell side of the regenerated hair follicle primordium comes on the internal side of the body of the recipient, in that hair growth orientation can be controlled to the body surface side. Moreover, it is preferred that the transplantation depth is adjusted so that the top edge of the epithelial cell component of the regenerated hair follicle primordium is exposed at the top edge of the transplantation wound, in that continuity with the epithelial cells of the recipient can be further enhanced.

Moreover, when transplanting regenerated hair follicle primordium having a guide, the guide and the subject site can be fixed with a tape or band for skin adhesion etc. so that the guide does not fall out after transplantation.

After the continuity of the epithelial cells on the recipient side and the epithelial cell-derived side of the regenerated hair follicle primordium is ensured in a little while after transplantation of regenerated hair follicle primordium, the guide can be pulled out of the transplantation site. The timing of pulling out the guide can be appropriately set, and for example it is preferred that the guide is pulled out from the transplantation site 3-7 days after transplantation. Alternatively, the guide can be left until it falls out of the transplantation site on its own. A guide of bioabsorbable material can be left until it falls out of the transplantation site on its own or it is degraded/absorbed.

In this way, by retaining the regenerated hair follicle primordium for transplantation on a guide, the epithelial cells on the recipient side extends towards the inside of the transplantation site along the guide so as to eliminate the foreign body, and on the other hand, the epithelial cell-derived cells of the regenerated hair follicle primordium extends toward the guide. Hence, the continuity between the epithelial cells on the recipient side and the epithelial cell side of the regenerated hair follicle primordium after transplantation can be improved. Moreover, by inserting a guide, maintenance of polarity with epithelial cells and mesenchymal cells in regenerated hair follicle primordium in culture can also be improved and is preferable. Hence, efficiency of hair follicle formation can be enhanced, and orientation at transplantation can be facilitated. In particular, when a guide is used for regenerated hair follicle primordium, continuity between regenerated hair follicle primordium and the epithelial cells on the recipient side can be ensured, and in addition hair follicle formation towards the intended direction can be promoted. As a result, hair growth rate from regenerated hair follicle primordium can be improved, and control of hair growth orientation will also be possible.

The terms used herein, except for those that are particularly defined, are employed for describing particular embodiments, and do not intend to limit the invention.

Moreover, the term "comprising" as used herein, unless the content clearly indicates to be understood otherwise, intends the presence of the described items (such as components, steps, elements, and numbers), and does not exclude the presence of other items (such as components, steps, elements, and numbers).

Unless otherwise defined, all terms used herein (including technical and scientific terms) have the same meanings as those broadly recognized by those skilled in the art of the technology to which the present invention belongs. The terms used herein, unless explicitly defined otherwise, are to be construed as having meanings consistent with the meanings herein and in related technical fields, and shall not be construed as having idealized or excessively formal meanings.

The present invention will now be described in further detail with reference to Examples. However, the present invention can be embodied by various aspects, and shall not be construed as being limited to the Examples described herein.

Examples

Preparation of Hair Follicle Primordium in the Absence of Culture Support
(1) Laboratory Animals Hair follicles were collected from 7-8 weeks-old C57BL/6 mice (CLEA Japan) and C57BL/6-TgN (act-EGFP) mice (CLEA Japan). Moreover, skin comprising body hair primordium was collected from C57BL/6-TgN (act-EGFP) mice (SLC) at fetal age 18.0-18.5 days. Moreover, regenerated hair follicle primordia manufactured by the experimental method below were transplanted to 6-8 weeks-old BALB/c nu/nu mice (SLC).
(2) Preparation of Hair Papilla Cells Preparation of hair papilla cells was performed according to the method of prior literature (Domestic re-publication of PCT International Application No. 2012/108069). In other words, C57BL/6 mice were euthanized by cervical dislocation, and then all layers of skin and the subcutaneous tissue of the cheek were collected so as not to damage the hair bulb portion. After removing the subcutaneous tissue surrounding the whiskers, hair follicles were separated. Whisker hair follicles in growth phases I-IV were selected, the collagen sheath was removed with a 25 G injection needle, and the hair follicles were exposed. The hair bulb portion was separated, and the hair papilla was resected. The resected hair follicle and hair papilla were stored in DMEM (Thermo Fisher Scientific) medium comprising 10% bovine fetal serum and 1% Penicillin-Streptomycin solution (DMEM 10). The separated hair papilla was seeded in a 3.5 cm plastic culture dish (Becton Dickinson), and subjected to primary culture in DMEM 10 comprising 10 ng/mL of FGF2 (WAKO) under 5% $CO_2$, 37° C., and 95% humidity environment. Primary culture hair papilla cells were subjected to medium exchange on Day 4 and Day 8, and used after 9 days of culture. Primary culture hair papilla cells were washed three times with PBS (-), and then detached with 10 mM EDTA solution (Thermo Fisher Scientific) comprising 0.05% trypsin, trypsin was neutralized with DMEM 10, washed sufficiently, and then stored at below ice temperature until use.

Figure 1:
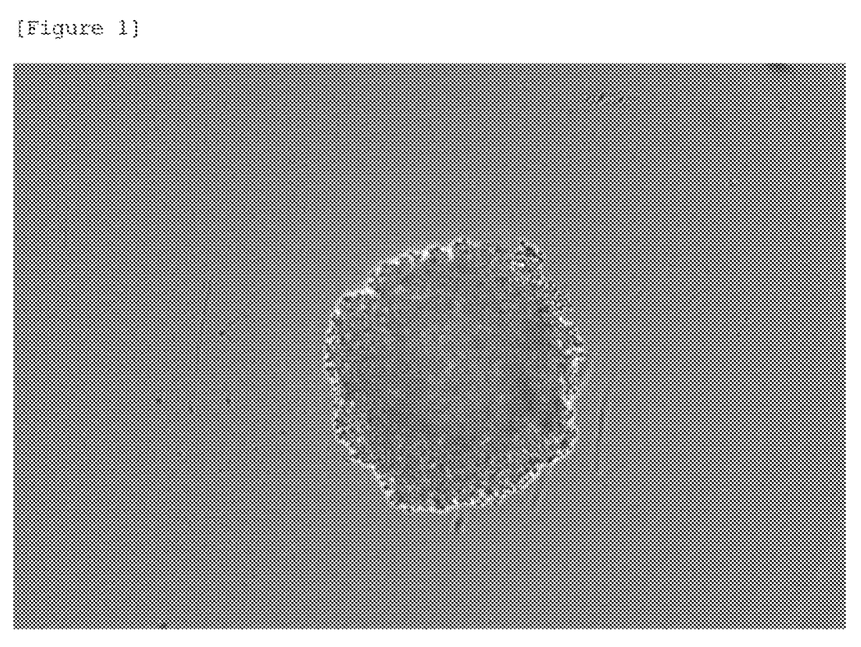
FIG. 1 shows a stereomicroscope image of a hair papilla cell spheroid prepared in accordance with the method according to the embodiments of the present invention.

Mouse hair papilla cells were seeded in a 96-well V-bottomed plate (Sumitomo Bakelite) at a density of $1\times10^4$ cells/100 µL of DMEM 10 or $3\times10^4$ cells/100 µL of DMEM 10, and centrifuged at 440×g for 1 minute to settle the cells at the bottom of the plate. The plate after centrifugation was left in an incubator at 37° C. and 5% $CO_2$ for 5.5 hours to allow formation of spheroids (FIG. 1).
(3) Preparation of Bulge Cells The collagen sheath was removed from whisker tissue resected from C57BL/6-TgN (act-EGFP) mice with a 25 G injection needle, and subdivided into the bulge region. The bulge region tissue was reacted in 100 U/mL of Collagenase (Worthington) solution diluted with Dispase at 50 caseinolytic U/mL (Becton Dickinson) at 37° C. for 4 minutes, and then surgically separated with a 25 G injection needle into the bulge region epithelial tissue and the mesenchymal tissue surrounding the bulge. The separated bulge region epithelial tissue was subjected to 1 hour of enzyme treatment with 0.05% Trypsin (Thermo Fisher Scientific) in an incubator, and ran through a 35 µm pore cell strainer to obtain singled cells.

The culturing of the singled cells was carried out by performing a three-dimensional culture in a 6-well plate by employing ADVANCED DMEM/F-12 (Thermo Fisher Scientific), DEF-CS (Cellartis), CnT-PR (CELLnTEC), or a mixed medium of ADVANCED DMEM/F-12 and DEF-CS as the base medium, and Matrigel (Corning) or Type IV Collagen (Thermo Fisher Scientific) as the scaffolding, and after suspending the cells in a medium (medium for bulge cells) comprising B27 supplement (Thermo Fisher Scientific), N2 supplement (Thermo Fisher Scientific), Rock inhibitor (Y27632, WAKO), EGF (Peprotech), FGF7 (R&D), FGF10 (R&D), SHH agonist (SAG, cayman), or BMP inhibitor (Noggin, Peprotech), and 1% Penicillin-Streptomycin (Thermo Fisher Scientific) as the additive.

The gel comprising cultured bulge cells having performed three-dimensional culture was recovered, subjected to Collagenase I digestion, Trypsin digestion, and DNase Type I (Sigma) digestion, suspended in the medium, and then ran through a 35 µm cell strainer to obtain mouse bulge cells.

Figure 2:
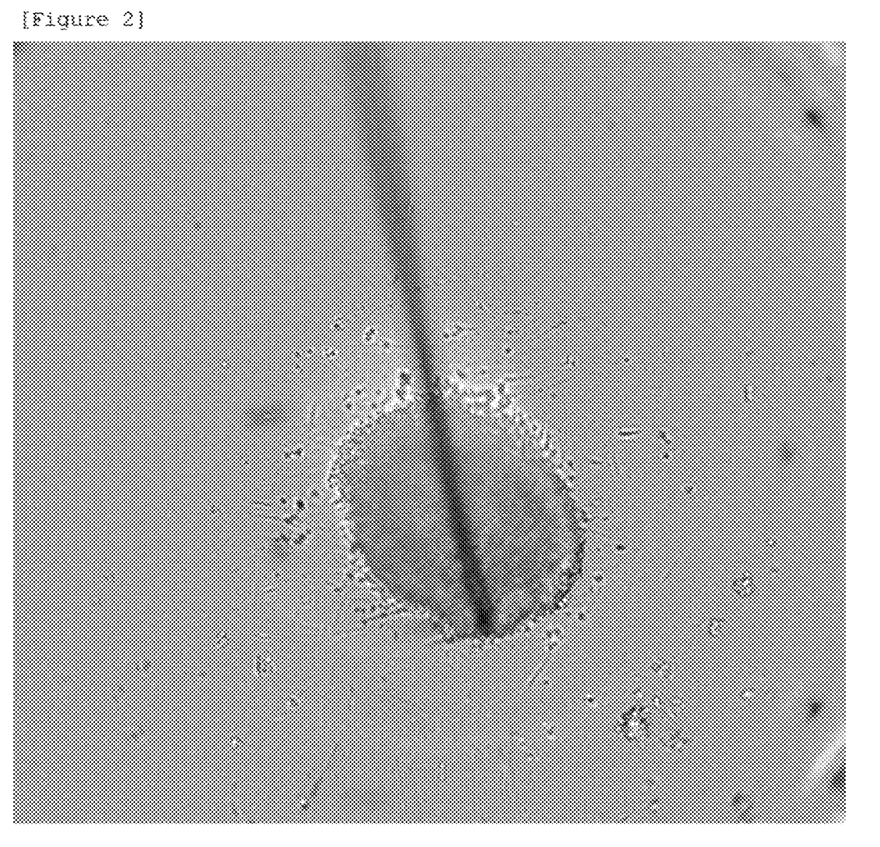
FIG. 2 shows a stereomicroscope image showing a state where a nylon guide filament is inserted into a bulge cell spheroid prepared in accordance with the method according to the embodiments of the present invention.

The mouse bulge cells were seeded in a 96-well V-bottomed plate at a density of $1\times10^4$ cells/100 µL of medium for bulge cells or $3\times10^4$ cells/100 µL of medium for bulge cells, and the cells were settled by centrifugation at 440×g for 1 min. A nylon guide filament was inserted into the center of the cell mass immediately after centrifugation, and then left in an incubator at 37° C. and 5% $CO_2$ for 4 hours to allow formation of spheroids (FIG. 2).

Figure 3:
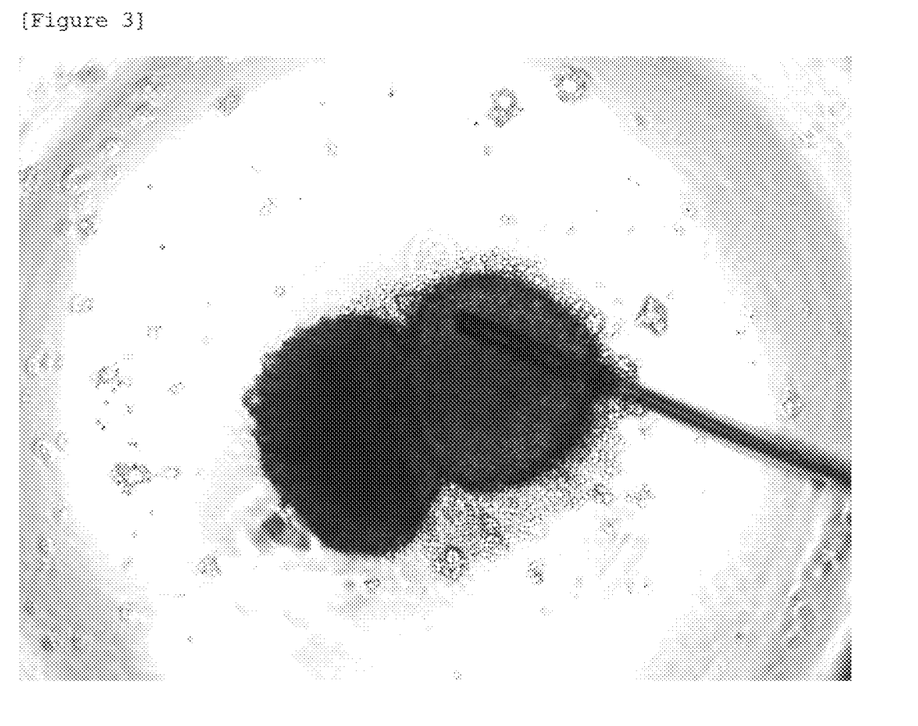
FIG. 3 shows a stereomicroscope image of hair follicle primordium produced by reconstruction of hair papilla cell spheroid and a bulge cell spheroid having a nylon guide filament inserted.

The hair papilla cell spheroids formed after 4 hours of incubation were transferred with a micropipette to bulge cell spheroid wells, and left in an incubator at 37° C. and 5% $CO_2$ to allow adherence with the bulge cell spheroids, and cultured for 8-16 hours to allow formation of hair follicle primordium (FIG. 3).

Hair follicle primordium after 8-16 hours of culture was intradermally transplanted to mouse according to the method described in U.S. Pat. No. 5,932,671. In other words, 6-8 weeks-old BALB/c nu/nu mice were anesthetized according to a conventional method, the back region was disinfected with Isodine, and then allowed to take a natural recumbent position. A puncture was made with V-lance microscalpel (Alcon Japan), and a transplantation wound reaching from the epidermal layer of skin to the lower part of the dermal layer was formed. Transplantation wound was up to a depth of about 400 µm in the vertical direction from the body surface, and the horizontal direction was about 1 mm. Regenerated hair follicle primordium having a nylon filament guide inserted was inserted with sharp-pointed tweezers No. 5 (Natsume Seisakusho) so that the epithelial cell component was facing towards the body surface side of the transplantation wound. The transplantation depth was adjusted so that the top edge of the epithelial cell component of the regenerated hair follicle primordium was exposed at the top edge of the transplantation wound, and positioned so that the nylon filament guide was exposed on the body surface. The nylon filament guide was fixed to the skin surface in the proximity of the transplantation wound with Steri-Strip (3M), and then the transplantation wound was protected with Nurseban and Surgical Tape (3M). The tapes were removed at 5-7 days after transplantation, the nylon filament guide was allowed to remain at the transplantation site, and then pulled out if it still remained after one day. Follow-up was performed after engraftment of the transplant was determined by visual confirmation or fluorescent stereomicroscope. For follow-up, the transplantation sites of mice under anesthesia were observed and photographed by visual confirmation, fluorescent stereomicroscope, and stereomicroscope, and the hair growth of regenerated hair follicles was evaluated.

Figure 4:
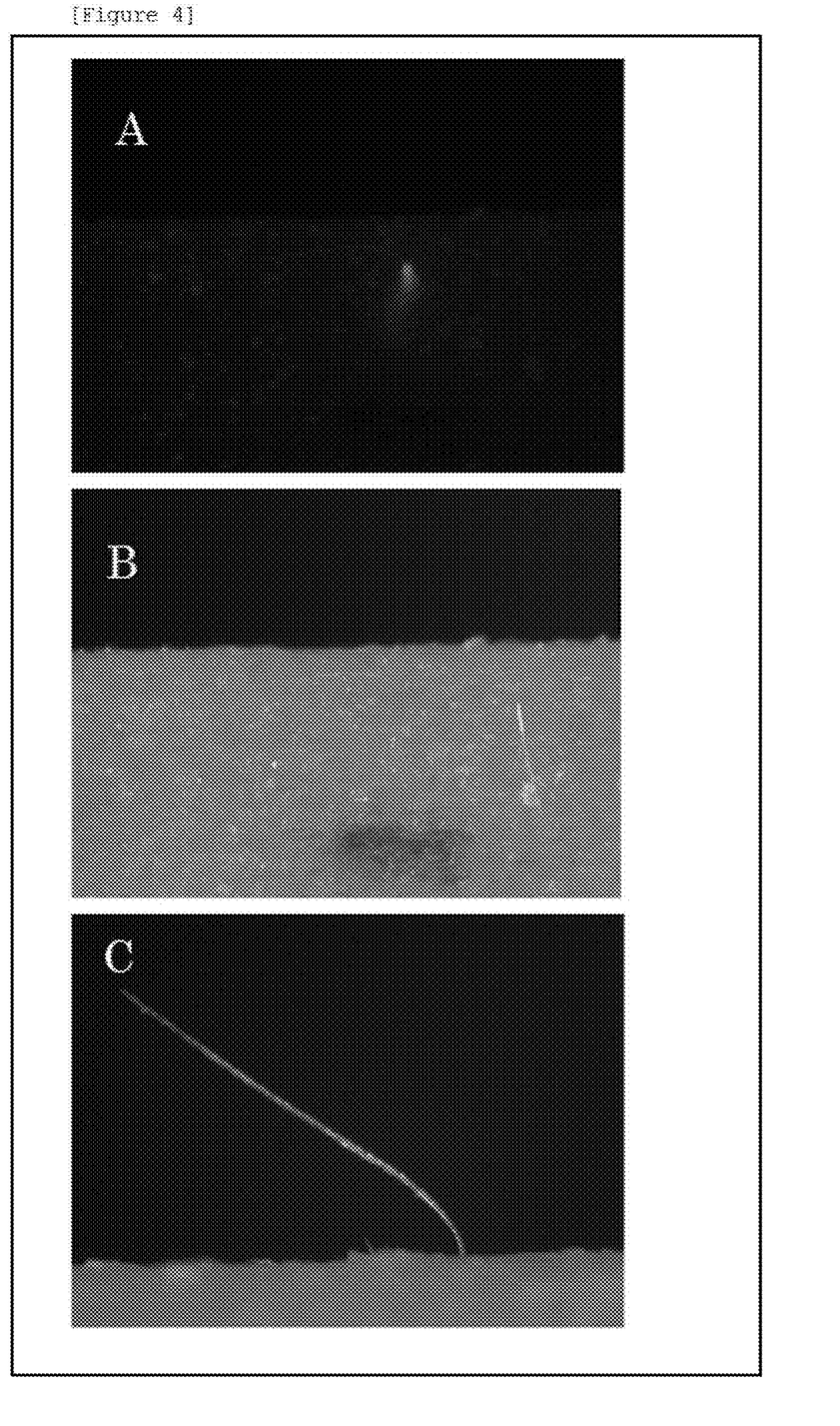
FIG. 4 shows the observation results of regenerated hair follicle at 27 days post transplantation (A: fluorescent microscope image, B and C: erupted hair shaft observed by stereomicroscope).
Figure 5:
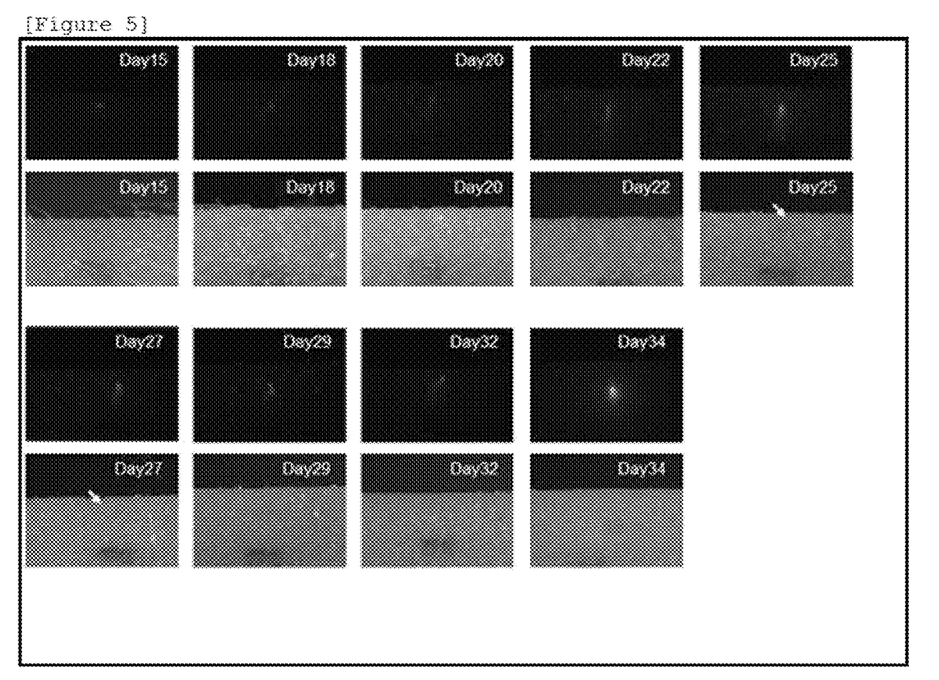
FIG. 5 shows the follow-up results of regenerated hair follicle intradermally transplanted to mouse (top: fluorescent microscope image, bottom: stereomicroscope image).

Since eruption of hair shaft the mouse transplantation site was observed on Day 25 after transplantation, and hair shaft extension continued until Day 27 after transplantation, it became clear that functional hair follicle primordium was regenerated (FIGS. 4 and 5).

Spheroids were efficiently formed in a 96-well plate. It also became clear that functional hair follicle primordium was regenerated even without employing a culture support such as collagen gel in the reconstitution of hair follicle primordium. According to the above method, it was shown that since there was also no need to insert aggregates into collagen gel for reconstituting hair follicle primordium, it will be possible to produce hair follicle primordium with identical specification in a large quantity.

The invention claimed is:

1. A method for producing regenerated hair follicle primordia, comprising:
    forming a first cell aggregate in which epithelial cells are aggregated as a first population of cells;
    forming a second cell aggregate in which mesenchymal cells are aggregated as a second population of cells;
    arranging a guide in the first cell aggregate;
    obtaining regenerated hair follicle primordia by culturing the first cell aggregate including the first population of epithelial cells and the second cell aggregate including the second population of mesenchymal cells while allowing them to be in contact,
    wherein
    the first population of epithelial cells is a population of cells in which cultured cells derived from bulge region epithelium have been treated into single cells;
    the second population of mesenchymal cells is a group of cells in which cultured cells derived from dermal papillae have been treated into single cells;
    the guide is placed at a position where the first cell aggregate is formed before or during the formation process; and
    a culture support is not used when contacting the second cell population or the second cell aggregate with the first cell aggregate.

2. The production method according to claim 1, wherein the forming of said first cell aggregate comprises obtaining a spheroid of epithelial cells.

3. The production method according to claim 1, wherein the forming of said second cell aggregate comprises obtaining a spheroid of mesenchymal cells.

4. The production method according to claim 1, wherein at least one of forming said first cell aggregate and forming said second cell aggregate comprises aggregating said epithelial cells or said mesenchymal cells in a recess configured so that said epithelial cells or said mesenchymal cells are accumulated at a bottom of the recess.

5. The production method according to claim 4, wherein said recess has a V-shaped or a U-shaped bottom.

6. The production method according to claim 1, wherein the formation of said aggregate is performed by a centrifugation process performed at a centrifugal force (RCF) of 600×g or lower.

7. The production method according to claim 4, wherein said contact is performed by placing said first cell aggregate on said second cell aggregate which is placed in said recess.

8. The production method according to claim 1, wherein at least one of said epithelial cells and said mesenchymal cells is derived from adult hair follicles.

9. The production method according to claim 1, wherein the guide is placed in the cell aggregate of said first population of cells or the cell aggregate of said second population of cells before said contact.

10. The production method according to claim 9, wherein said guide is a filamentous structure.

11. The production method according to claim 9, wherein said guide is placed before the start of or during the formation of said first cell aggregate or said second cell aggregate at a position where the cell aggregate of said first population of cells or the cell aggregate of said second population of cells will be formed.

12. The production method according to claim 9, wherein the guide is inserted into either of the cell aggregate of said first population of cells or the cell aggregate of said second population of cells.

13. The production method according to claim 9, further comprising contacting the cell aggregate having said guide placed therein and the other population of cells so that said guide penetrates and protrudes on the exterior of at least said first population of cells or the cell aggregate thereof.

14. The production method according to claim 1, further comprising a step of inserting the guide so that it penetrates and protrudes on the exterior of at least said first population of cells after said contact.

15. The production method according to claim 14, wherein said guide is a filamentous structure.

16. The production method according to claim 9, wherein said guide is a fiber made from a synthetic polymer or a bioabsorbable polymer, a metallic fiber, a carbon fiber, a glass fiber, an animal fiber, or a plant fiber.

* * * * *